US006785597B1

(12) United States Patent
Farber et al.

(10) Patent No.: US 6,785,597 B1
(45) Date of Patent: Aug. 31, 2004

(54) HYDRAULIC STABILIZER SYSTEM AND PROCESS FOR MONITORING LOAD CONDITIONS

(75) Inventors: Bruce W. Farber, Oakview, CA (US); Liming Yue, Westlake Village, CA (US)

(73) Assignee: Wiggins Lift Co., Inc., Oxnard, CA (US)

( * ) Notice: Subject to any disclaimer, the term of this patent is extended or adjusted under 35 U.S.C. 154(b) by 0 days.

(21) Appl. No.: 10/359,810

(22) Filed: Feb. 7, 2003

(51) Int. Cl.[7] .............................. G06F 7/70; G06G 7/00

(52) U.S. Cl. ........................... 701/50; 701/29; 701/124; 73/65.01; 73/65.09; 187/224; 187/394; 187/404; 702/183; 414/589; 414/809; 212/278

(58) Field of Search ................................ 177/136, 139, 177/140, 141, 45–47; 702/173, 174; 212/276, 277, 278; 187/222, 223, 224, 233–238, 250, 391–405; 414/635–636, 639–640, 474–486, 572–573, 589–590, 809; 701/29, 36, 50, 124; 73/65.01, 65.09, 382 R; 340/679, 684, 689, 685, 438, 439, 440, 450, 451, 459, 460, 461

(56) References Cited

U.S. PATENT DOCUMENTS

| | | | | | |
|---|---|---|---|---|---|
| 3,965,733 | A | * | 6/1976 | Hutchings et al. | 701/50 |
| 4,185,280 | A | * | 1/1980 | Wilhelm | 212/278 |
| 4,511,974 | A | * | 4/1985 | Nakane et al. | 701/124 |
| 4,516,116 | A | * | 5/1985 | White | 340/685 |
| 4,906,981 | A | * | 3/1990 | Nield | 340/685 |
| 5,067,572 | A | * | 11/1991 | Kyrtsos et al. | 177/139 |
| 5,160,055 | A | * | 11/1992 | Gray | 212/278 |
| 5,666,295 | A | | 9/1997 | Bruns | 702/174 |
| 5,995,001 | A | * | 11/1999 | Wellman et al. | 340/438 |
| 6,050,770 | A | * | 4/2000 | Avitan | 414/636 |
| 6,385,518 | B1 | | 5/2002 | Rickers et al. | 701/50 |
| 6,425,728 | B1 | | 7/2002 | Goto | 414/636 |
| 6,611,746 | B1 | * | 8/2003 | Nagai | 701/50 |

* cited by examiner

*Primary Examiner*—Jacques H. Louis-Jacques
(74) *Attorney, Agent, or Firm*—Kelly Lowry & Kelley, LLP

(57) ABSTRACT

A process for monitoring load conditions on a lifting machine having a rated load moment includes determining an actual load moment of the lifting machine due a weighted load. The actual load moment may be determined by measuring a tilt pressure within a hydraulic tilt cylinder of the lifting machine, and then calculating the actual load moment from the tilt pressure within the hydraulic tilt cylinder. The location of a center of gravity of the weighted load is also determined by measuring a lift pressure within a hydraulic lift cylinder of the lifting machine, and then calculating the weight of the weighted load from the lift pressure. Once the weight is determined, the location of the center of gravity of the weighted load may be found using the actual load moment and the calculated weight. Information about the weight and the location of the center of gravity of the weighted load may be also provided to a user as well as warnings if the operating parameters of the lifting machine are in danger of being exceeded or actually exceeded. If a load pressure switch of the lifting machine is activated, at the very least, the lifting function of the machine will be disabled.

49 Claims, 5 Drawing Sheets

HYDRAULIC STABILIZER SYSTEM AND PROCESS FOR MONITORING LOAD CONDITIONS

BACKGROUND OF THE INVENTION

The present invention relates to a lifting device. More particularly, the present invention relates to a lifting device capable of calculating the center of gravity of a load and determining if the center of gravity exceeds safety parameters.

In fork lifts, the tipping moment is critical to machine safety. In fork-lift trucks, the center of gravity of the lifted load is naturally outside the wheel contact surface. The amount of counterweight is sized based on factors such as wheel base, lifting capacity, and distance from the center of the front axle to the center of the load.

In some applications, the operator has a limited knowledge of either the weight of the lifted load, the center of gravity of the load, or both. If an operator lifts a load that has a weight within the lifting capacity of the machine, but the center of gravity is too far out front, the machine risks tipping forward. If the center of gravity of the load is within the machine rating, but the weight lifted is too great, the machine risks tipping forward. The product of the load weight times the distance to the load center is known as the load moment. The operator needs to know if the load moment is within the safe limits of the machine.

In other lifting systems, such as cranes, there are many techniques used to provide an operator information on the safe lifting of various loads. In most fork lift applications, if the load weight varies or is not known, a scale is added to the machine such that the load weight can be measured and displayed. The shape of the load is typically of a sort that an operator can easily measure or evaluate the load center of gravity location. Thus, in most fork lift applications, the operator can determine the safety of lifting various loads.

Prior attempts have been made to address the issue of tilt and center of gravity. For example, Rickers et al., U.S. Pat. No. 6,385,518, discloses an industrial truck, such as a fork-lift, that detects a tilt of the industrial truck based on wheel load. Wheel load sensors are used to detect a load moment of the fork-lift and then signal an alarm if tilt is detected. However, the condition of the wheels themselves may affect the ability of the wheel load sensors to properly detect load moment. In another example, Goto, U.S. Pat. No. 6,425,728, discloses a tilt speed control system that controls the tilt speed of a fork-lift mast, based on the weight of a load and lift height of the load as the load is being lifted. However, this system fails to assist the user in determining if the load is causing the lift to exceed safety limits. In a further example, Bruns, U.S. Pat. No. 5,666,295, discloses dynamic weighing of loads in hydraulically operated lifts. However, Bruns only discloses determining the weight of a load and fails to assist the user in determining if the load is causing the lift to exceed safety limits.

In a few applications, even if the operator knew the weight of the load, there still might be considerable difficulty in determining the location of the center of gravity. An example is that-of lifting boats. Engine location, amount and location of ballast, amount of fluid in the water and fuel tanks, all can be extremely difficult for the operator to determine or evaluate. There is a need to know what the load moment is as the forks engage the boat hull.

While methods such as those described above may provide a means for tilt caused by a load on a lift, such methods can always be improved.

Accordingly, there is a need for a means to measure both load weight and load moment as the load is engaged on the lifting machine. Further, there is a need to provide information to the operator about the weight and location of the center of gravity, provide a warning if the load is near the rated capacity of the machine, and disable the lifting capability if there is a danger of tipping. The present invention fulfills these needs and provides other related advantages.

SUMMARY OF THE INVENTION

The present invention resides in a process and system for a lifting determining an actual load moment, weight, and location of the center of gravity of a weighted load on a lifting machine and determining if the safety parameters of the machine are exceeded.

The invention provides a means to measure both load weight and load moment as the load is engaged on the lifting machine, provide information to the operator about the weight and location of the center of gravity, provide a warning if the load is near the rated capacity of the machine, and disable the lifting capability if there is a danger of tipping.

In accordance with a preferred embodiment of the present invention, a process for monitoring load conditions on a lifting machine having a rated load moment includes determining an actual load moment of the lifting machine due a weighted load. The actual load moment may be determined by measuring a tilt pressure within a hydraulic tilt cylinder of the lifting machine, and then calculating the actual load moment from the tilt pressure within the hydraulic tilt cylinder.

The process also includes determining a location of a center of gravity of the weighted load. This is determined by measuring a lift pressure within a hydraulic lift cylinder of the lifting machine, and then calculating the weight of the weighted load from the lift pressure. Once the weight is determined, the location of the center of gravity of the weighted load may be found using the actual load moment and the calculated weight.

Information about the weight and the location of the center of gravity of the weighted load may be also provided to a user. Warnings may be provided to the user if the weighted load is near the rated load moment of the lifting machine. A first warning may be activated if the actual load moment is below a first predetermined load moment. Second and third warnings may be activated, respectively if the actual load moment is above the first predetermined load moment and below a second predetermined load moment, or if the actual load moment is above the second predetermined load moment.

The first, second, and third warnings may be in the form of colored lights. The first and second predetermined load moments may be, respectively, between 80% to 100% of the rated load moment and 100% to 120% of the rated load moment. Additionally, an audio alarm may be engaged, respectively, if the actual load moment is above the first predetermined load moment and below the second predetermined load moment or if the actual load moment is above the second predetermined load moment.

If a load pressure switch of the lifting machine is activated, the hydraulic lift will be disabled.

Further in accordance with the present invention, a hydraulic stabilizer system may be configured as a hydraulic lift having a rated load moment. The system includes a means for measuring pressure within the hydraulic lift and a processor for determining an actual load moment of the hydraulic lift and for determining a weight of a load on the hydraulic lift based on pressure within the hydraulic lift.

The system also includes an illuminated display for warning an operator of the hydraulic lift if at least one predetermined operating parameter is exceeded; and a load pressure switch for disabling the hydraulic lift if another predetermined operating parameter is exceeded.

The hydraulic lift includes a frame, at least one load bearing member operationally connected to the frame for movement relative thereto. The lift also includes a hollow lift cylinder housing a lift piston and hydraulic fluid and a hollow tilt cylinder housing a tilt piston and hydraulic fluid. Each cylinder piston is operationally connected to the load bearing member, with the hydraulic fluid disposed between the piston and one end of the frame. The lift piston imparts a lift force upon the hydraulic fluid within the lift cylinder proportional to a weight associated with the load bearing member and the tilt piston imparts a tilt force upon the fluid proportional to a load moment associated with the load bearing member.

The means for measuring pressure within the hydraulic lift may be a number of pressure sensors with at least one pressure sensor in fluid communication with the hydraulic fluid within the lift cylinder and at least one pressure sensor in fluid communication with the hydraulic fluid within the tilt cylinder. The lift pressure sensor measures pressure of the hydraulic fluid within the lift cylinder for a period of time and creates electrical signals corresponding thereto, defining at least one pressure measurement within the lift cylinder, with the pressure within the lift cylinder being related to the lift force associated with the load bearing member. The tilt pressure sensor measures pressure of the hydraulic fluid within the tilt cylinder for a period of time and creates electrical signals corresponding thereto, defining at least one pressure measurement within the tilt cylinder, with the pressure being related to the tilt force associated with the load bearing member.

The processor includes a first sub-routine of a program stored in a memory to be operated on by the processor, determining, from a plurality of pressure measurements within the lift cylinder, the weight of the load on the hydraulic lift. The processor also includes a second subroutine of the program stored in the memory to be operated on by the processor, determining, from another plurality of pressure measurements within the tilt cylinder, an actual load moment of the load on the hydraulic lift. The processor may then use another sub-routine of the program that uses the actual load moment and the weight of the load to determine a location of a center of gravity of the load on the hydraulic lift.

The illuminated display is in data communication with the processor and produces a visual representation of the weight on the hydraulic lift. The illuminated display activates a first warning if the actual load moment is below a first predetermined load moment, activates a second warning if the actual load moment is above the first predetermined load moment and below a second predetermined load moment, and activates a third warning if the actual load moment is above the second predetermined load moment.

As stated above, the first predetermined load moment may be 80% to 100% of the rated load moment, and the second predetermined load moment may be 100% to 120% of the rated load moment. Also, the first, second, and third warnings may be colored lights. Again, the illuminated display may engage a first audio alarm if the actual load moment is above a first predetermined load moment and below a second predetermined load moment, and/or engage a second audio alarm if the actual load moment is above the second predetermined load moment.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

The present invention is useful in a variety of applications involving lifting machines, in particular, forklifts that lift loads, such as watercraft. It provides a means to measure operating conditions of the lifting machine, such as both the weight and longitudinal load moment of a load as the load is engaged on the lifting machine. When combined with the geometry of the lifting machine, the load moment and load weight are used to calculate the load center of gravity location. Continuous information may also be provided to a user operating the lifting machine; information relating to the weight and location of the center of gravity during the lifting, transporting, and lowering of the load. The present invention also provides a warning if the load is near a rated capacity of the lifting machine, and disables the lifting capability of the lifting machine if there is a danger of the lifting machine tipping. The lifting machine has a rated load moment determined by adding the rated load center (i.e., distance from the face of the forks to the center of the rated load) to the lost load (i.e., distance from the face of the lifting machine to the center of a front drive axle of the lifting machine). The result is then multiplied by the load weight to reach the rated load moment.

A process and system are designed for continuously monitoring the operating conditions of the lifting machine by monitoring pressure in the tilt and lift cylinders of the lifting machine. This tilt pressure is proportional to the tilt moment of the fork lift. Use of this tilt pressure combined with lift hydraulic pressure through a mathematical algorithm, executed by an on-board processor, yields values for both load weight and load center of gravity. This provides for a system with continuous, real-time monitoring of an operator's usage of the machine and provides warnings and function disabling in order to improve safety.

Figure 1:
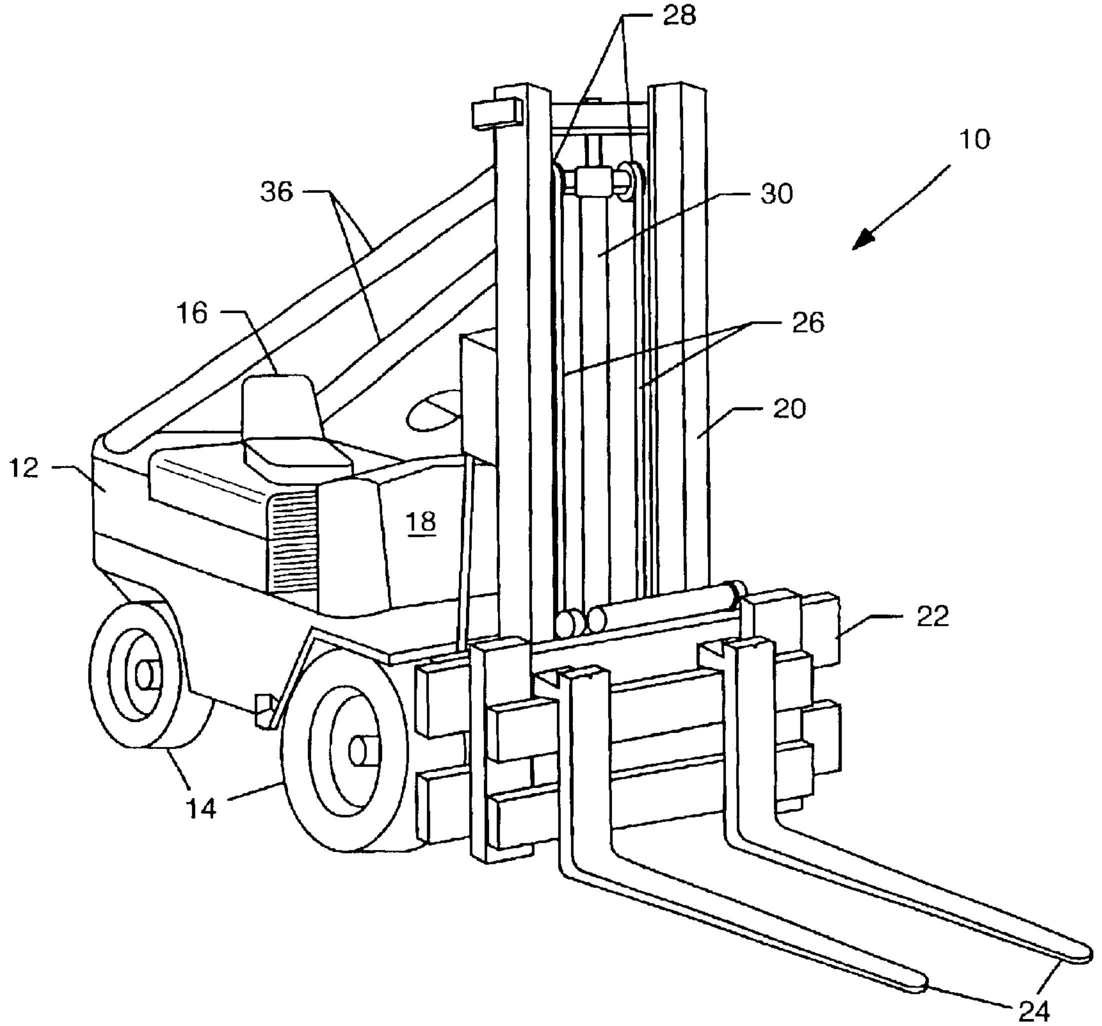
FIG. 1 is an orthogonal view of a hi-lift marina bull in accordance with an embodiment of the present invention.
Figure 2:
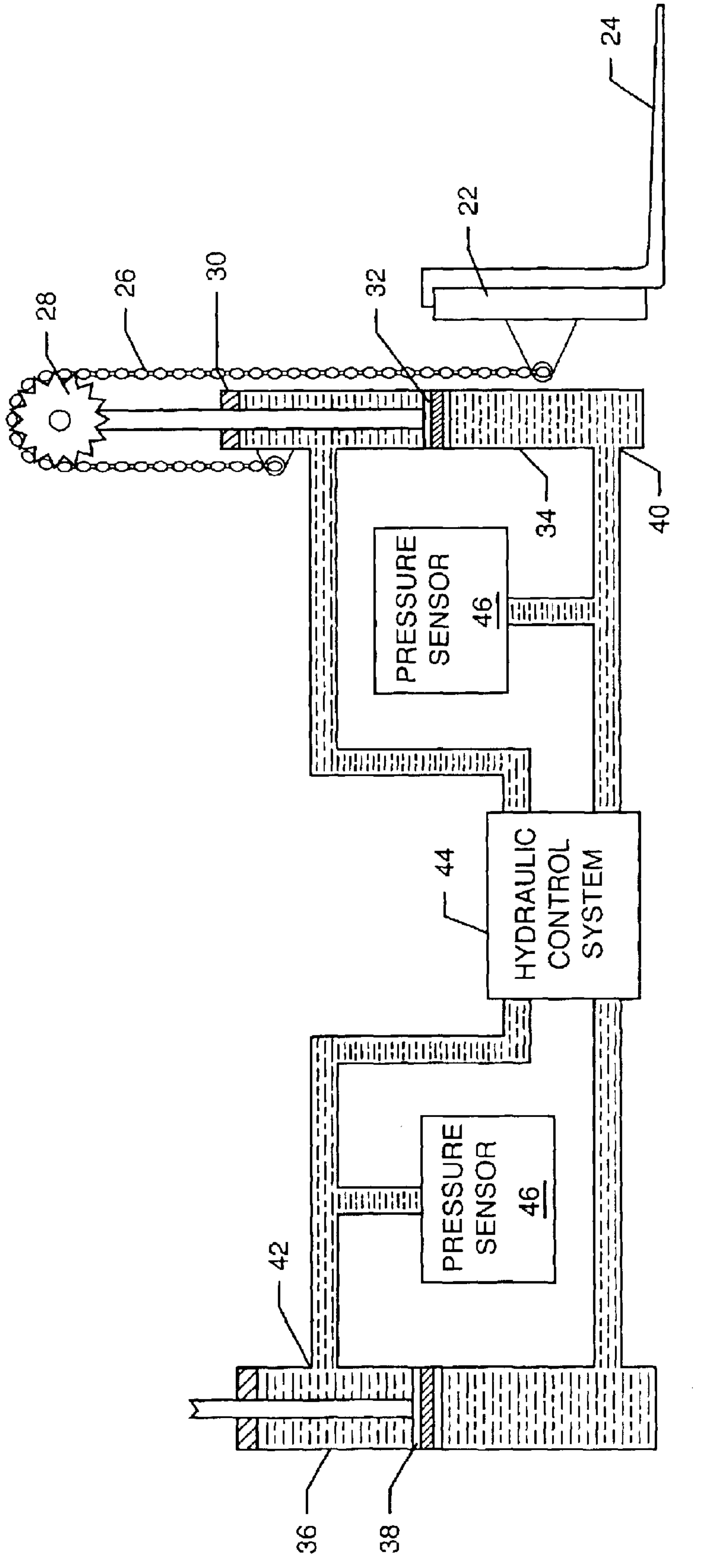
FIG. 2. is a simplified schematic view of a hydraulic system of hi-lift marina bull of FIG. 1.
Figure 3:
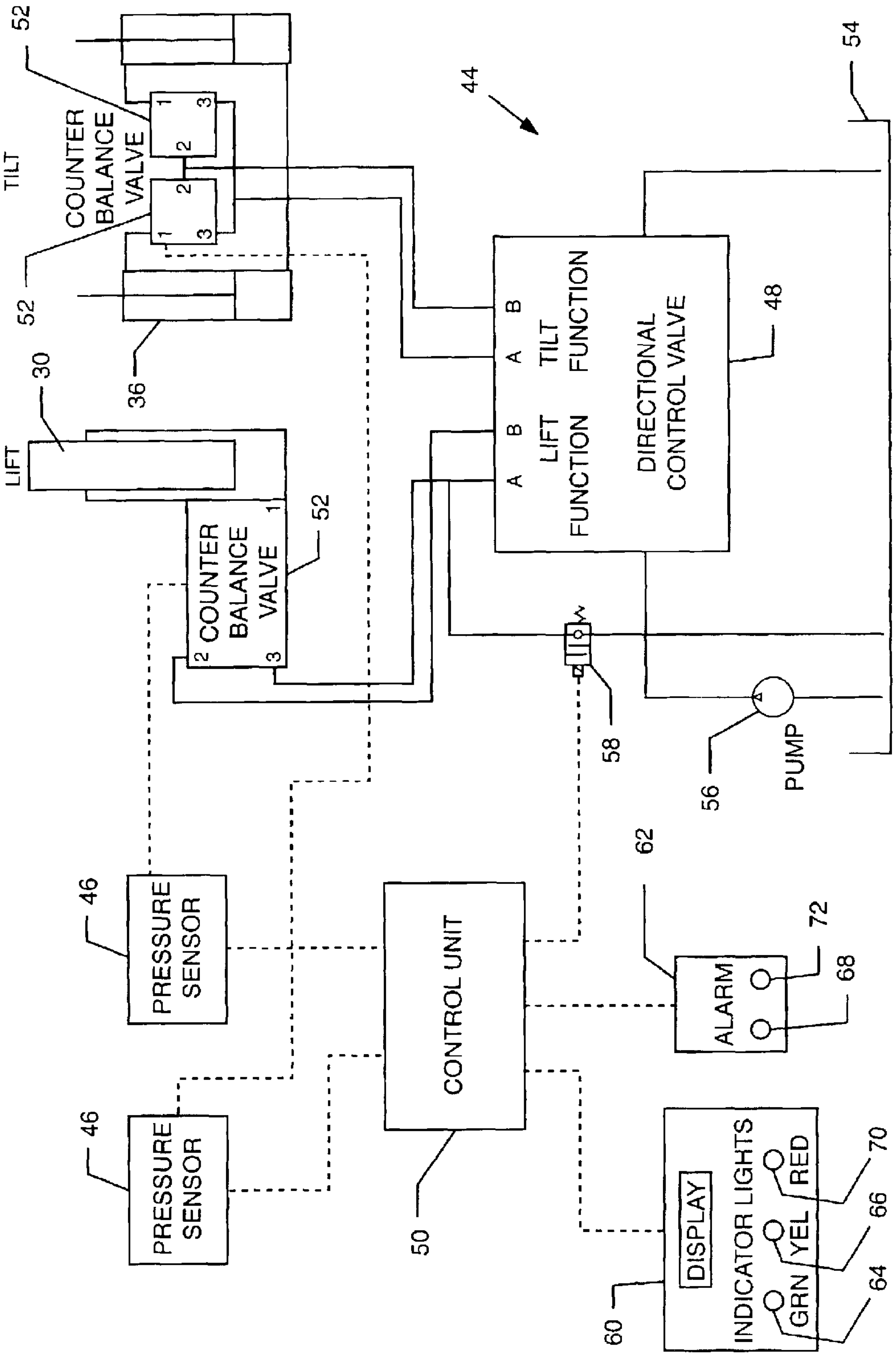
FIG. 3. is a simplified schematic view of the electrical/hydraulic system of the hi-lift marina bull of FIG. 1.

In accordance with the invention, a hydraulic stabilizer system may be configured on a number of different hydraulic lifting machines, such as a fork-lift, marina bull, yard bull, etc. However, for the purposes of discussion, as illustrated in FIGS. 1–3, the present invention will be described with reference to a high-lift marina bull 10 having a rated load moment. The marina bull 10 has a main body or frame 12 supported by a plurality of wheels 14. The main body 12 further includes a operator seat 16 having a control console 18 to control the operation of the marina bull 10. Attached to the main body 12 is a vertically extending mast 20. A load bearing member, in the form of a carriage 22, is movably attached to the mast 20 and includes a plurality of forks 24, extending perpendicular from the mast 20 away from the main body 12. Lift-chains 26 are attached to the carriage 22 and extend over sprockets 28 which are positioned proximate to one end of the mast 20, opposite to the plurality of wheels 14. At least one hollow lift cylinder 30 housing a lift piston 32 and hydraulic fluid 34 is attached to the mast 20, with one end of the lift-chains 26 being attached to the cylinder 30. The piston 32 is connected to the sprockets 28 by a rod and movement of the cylinder 30 causes the carriage 22 to move along the mast 20. One or more hollow tilt cylinders 36, preferably two tilt cylinders, are also attached to the main body 12. Each tilt cylinder 36 houses a tilt piston 38 and hydraulic fluid 34, with one end of each tilt cylinder 36 attached to the mast 20 (by the rod connected to the tilt piston 38) and the other end of the tilt cylinder 36 is connected to the frame 12. Movement of the tilt cylinders 36 causes the mast 20 to tilt so as to prevent tipping of the high-lift marina bull 10.

Hydraulic fluid 34 in the lift cylinder 30 is disposed between the lift piston 32 and one end of the cylinder 30 having an aperture 40, with the piston 32 imparting a force upon the hydraulic fluid 34 proportional to a weight associated with the load bearing member (i.e., carriage 22, forks 24, and load). Hydraulic fluid 34 in each tilt cylinder 36 is disposed between the piston 38 and one end of the cylinder 36 having an aperture 42, with the piston 38 imparting a force upon the hydraulic fluid 34 proportional to a load moment associated with the load bearing member (i.e., carriage 22, forks 24, and load).

A conventional hydraulic control system 44 is connected to the control console 18. The hydraulic control system 44 is in fluid communication with each cylinder 30, 36, and regulates the ingress and egress of the hydraulic fluid 34 through the respective apertures 40, 42 of each cylinder 30, 36. A means for measuring pressure 46 is located between the control system 44 and each cylinder 30, 36. The control system 44 includes a directional control valve 48 that routes hydraulic fluid 34 into the top or bottom of a given hydraulic cylinder (i.e., above or below the piston) 30, 36 in order to cause the cylinder 30, 36 to expand or contract by moving the piston within each cylinder 32, 38.

In order to measure the pressure of the hydraulic fluid 34 in the cylinders 30, 36, the means for measuring pressure 46, such as a pressure sensor which may be in the form of a pressure transducer, is placed in fluid communication with hydraulic fluid 34 within each cylinder 30, 36. The pressure sensor converts pressure readings into electrical signals. A control unit 50 is in electrical communication with the means for measuring pressure and receives the electrical signals from the pressure sensors to determine, from the pressure of the fluid 34 within the lift cylinder 30, the weight of a load on the forks 24, and from the pressure of the fluid 34 within the tilt cylinder 36, the load moment of the load on the forks.

The pressure sensor 46 connected to the lift cylinder 30 continuously measures the pressure of the hydraulic fluid 34 within the lift cylinder 30 and creates electrical signals corresponding thereto, defining at least one pressure measurement within the lift cylinder 30. The pressure within the lift cylinder 30 is related to the lift force associated with the load bearing member (i.e., the force required to lift the carriage 22, forks 24, and load on the load bearing member). The pressure sensor 46 connected to the tilt cylinder 36 continuously measures the pressure of the hydraulic fluid 34 within the tilt cylinder 36 and creates electrical signals corresponding thereto, defining a at least one pressure measurement within the tilt cylinder 36. The pressure within the tilt cylinder 36 is related to the tilt force associated with the load bearing member (i.e., the force required to tilt the carriage 22, forks 24, and load on the load bearing member).

The pressure sensors 46 are connected to counter-balance valves 52 which acts as check valves to hold the cylinders 30, 36 in position when the operator is not directing the expansion or contraction of the cylinders 30, 36. The counter-balance valves 52 are located between, and in fluid communication with, their respective cylinders 30, 36 and the directional control valve 48. The directional control valve 48 is in fluid communication with a hydraulic fluid tank 54. When activated, a pump 56 moves the hydraulic fluid 34 from the tank 54 to the directional control valve 48 which then directs the hydraulic fluid 34 to, for example, below the lift piston 32 of the lift cylinder 30 if a user desires to raise a load. When a user desires to lower a load, the directional control valve 48 directs hydraulic fluid 34 into the lift cylinder 30 above the lift piston 32 in order to lower the load.

The control unit 50 is electrically connected to a load pressure switch 58, in the form of a solenoid valve. The load pressure switch 58 is activated by electrical signals from the control unit 50 and disables the lift function by closing a valve that either diverts hydraulic fluid 34 back to the tank 54, or otherwise prevents the hydraulic fluid 34 from reaching the lift cylinder 30. When there is an overload condition that could cause the lifting machine 10 to tip over (e.g., weight of the load exceeds the capacity of the lifting machine; the actual load moment exceeds the rated load moment, etc.), the control unit 50 sends an electrical impulse to the pressure switch 58, opening the valve thereby disabling the lifting function of the lifting machine 10 by diverting the hydraulic fluid 34 from the directional control unit 48 to the tank 54.

The control unit 50 is also electrically connected to an illuminated display 60 and audio alarm 62 on or near the control console 18. The control unit 50 includes a digital computer that has a processor and a memory. In the alternative, an analog computer may be used. A computer program stored within the memory includes a mathematical algorithm, executed by the processor which yields load weight, load moment, and load center of gravity when the processor receives electrical signals corresponding to pressure measurements within the hydraulic lift and tilt cylinders 30, 36 from the means for measuring pressure 46.

A software program is stored in a memory to be operated on by the processor within the control unit 50. This program includes a first sub-routine for determining, from at least one pressure measurement within the lift cylinder 30, the weight of the load on the lifting machine 10. In the alternative, a plurality of lift cylinder pressure measurements may be taken, preferably ten pressure measurements. The program also includes a second sub-routine for determining, from at least one pressure measurement within the tilt cylinder 36, an actual load moment of the load on the lifting machine 10. In the alternative, a plurality of tilt cylinder pressure measurements may be taken, preferably ten pressure measurements. Yet another sub-routine within the program may then use the actual load moment and the weight of the load to determine a location of a center of gravity of the load on the lifting machine 10.

The illuminated display 60 warns an operator of the lifting machine 10 if a predetermined operating parameter of the lifting machine 10 is being exceeded. The illuminated display 60 is in data communication with the processor and produces a visual representation of the weight, actual load moment, and center of gravity. The visual representation may be produced by a Liquid Crystal Display (LCD) monitor, Cathode Ray Tube (CRT) monitor, dials, gauges, etc. If operating parameters are exceeded, warnings may be provided in the form of colored lights and/or audible alarms. For example, when the pressure on the rod side of the tilt cylinder(s) 36 is below a set pressure, the actual load moment is below a specified rated load moment (e.g., 90% of the rated load moment), a first warning, in the form of a green light 64 located on the display 60 will be illuminated. If the actual load moment is above the specified rated load moment and below a specified overload rated load moment (e.g., 110% of the rated load moment), a second warning, in the form of a yellow light 66 and a low frequency alarm 68 will be activated (the green light is not illuminated). If the actual load moment is above the specified overload rated load moment, a third warning, in the form of a red light 70 will be illuminated (green and yellow lights 64, 66 are not illuminated) and a high frequency alarm 72 will be activated, in addition to the lift function being disabled. Additionally, if a load pressure switch 58 is activated, the lift function is disabled, and lights 64, 66 are off while light 70 remains on.

The predetermined operating parameters may vary, depending on individual application and operating environment. The operator may change settings on the control console 18 for the proper application and operating environment. As stated above, the first predetermined load moment may be 90% of the rated load moment although the first predetermined load moment may be anywhere in the range of 80% to 90% of the rated load moment. Likewise, the second predetermined load moment may be 110% of the rated load moment although the second predetermined load moment may be anywhere in the range of 100% to 120% of the rated load moment. Also, the first, second, and third warnings may be colored lights. Again, the illuminated display may engage a first audio alarm if the actual load moment is above a first predetermined load moment and below a second predetermined load moment, and/or engage a second audio alarm if the actual load moment is above the second predetermined load moment. The first predetermined load moment may be in the range of 80% to 100% of the rated load moment, and the second predetermined load moment may be in the range of 100% to 120% of the rated load moment.

As stated above, the display 60 may produce a visual representation of the weight, actual load moment, and center of gravity. The illuminated display 60 may also include a visual representation of a graduated scale that illuminates and displays the actual load moment. This graduated scale may include indicia that runs from 0% to 150% of the rated load moment. The scale may included colored zones. For example, an actual load moment that is less than 50% of the rated load moment may be in a blue zone, an actual load moment that is more than 50% of the rated load moment but less than a first predetermined load moment may be in a green zone; an actual load moment that is in the between the first predetermined load moment and-a second predetermined load moment may be in a yellow zone, and an actual load moment that is above the second predetermined load moment may be in a red zone. As stated above, the first predetermined load moment may be in the range of 80% to 100% of the rated load moment, and the second predetermined load moment may be in the range of 100% to 120% of the rated load moment.

In the alternative, pressure sensors 46 may be in the form of pressure switches that may be placed in direct fluid communication with hydraulic fluid 34 within each cylinder 30, 36. The pressure switches sense pressure and create electrical signals that may be sent to one or more of the lights 64, 66, 70. These pressure switches are connected directly to a warning system that includes audio and visual alarms. For example, the pressure switch may be pre-set to be tripped if the pressure within the tilt cylinder 36 reaches a first predetermined load moment that is in the range of 80% to 100% of the rated load moment, and the second predetermined load moment is in the range of 100% to 120% of the rated load moment. In another example, the pressure valve connected to the lift cylinder may be pre-set to be tripped if the pressure within the lift cylinder 36 is at least, near or about the lifting capacity of the lifting machine.

Figure 4:
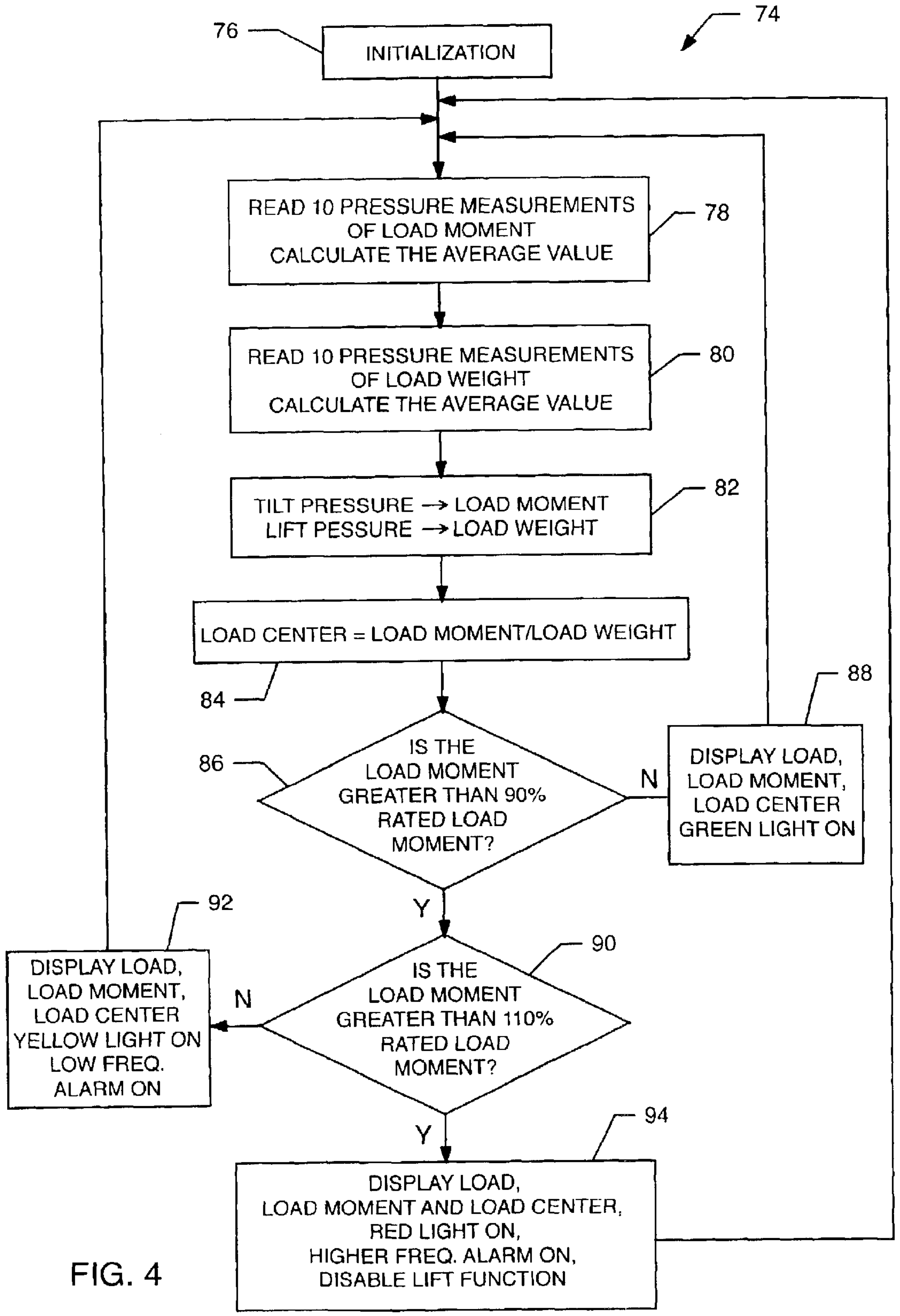
FIG. 4. is a flowchart illustrating a process for determining the actual load moment, actual load weight, and load center of gravity of a load lifted by the marina bull of FIG. 1.

In use, one particular embodiment of a process 74 for monitoring load conditions on a lifting machine having a rated load moment is illustrated in FIG. 4. The process 74 determines an actual load moment of the lifting machine 10 due the weight of the load by a computer program using input signals from pressure sensors 46. The actual load moment may be determined by measuring tilt pressure within the hydraulic tilt cylinder 36 of the lifting machine 10, and then calculating the actual load moment from the tilt pressure.

The process begins with an initialization period, 76 during which the lifting machine is activated and the control unit 50 begins a start-up process that activates the program stored in memory. Electrical signals from the pressure sensors 46 arrive at the processor, when then converts the signals into numerical values which the processor uses as input values for the program.

After initialization, the processor implements a first subroutine 78 of the program to calculate the actual load moment of the lifting machine 10 using a plurality of pressure measurements (e.g., ten pressure measurements) sent to the processor from the pressure sensors 46 connected to the tilt cylinder 36. The program then calculates the average value of the ten tilt pressure measurements and, temporarily, stores the value.

The processor then implements a second subroutine 80 of the program to calculate the actual weight of the load using ten lift pressure measurements sent to the processor from the pressure sensors 46 connected to the lift cylinder 30. The program then calculates the average value of the ten pressure measurements and, temporarily, stores the value.

The program then takes the stored values of the average tilt and lift pressures and converts 82 them, respectively, to load moment and load weight. The center of gravity of the load is then determined 84 by dividing the load moment by the load weight.

Once the load weight, actual load moment, and load center of gravity are determined, information and warnings about the preceding may be provided to the operator of the lifting machine 10 when the program determines if the actual load moment is greater than a pre-determined load moment somewhere in the range of 80% to 100% of the rated load moment of the lifting machine 10. If the load moment is not greater 88 than that predetermined load moment (e.g., 90% of the rated load moment of the lifting machine 10), the processor will then display a first warning, by illuminating the green light 64 located on the display 60. The processor will also output the calculated load weight, actual load moment, and center of gravity of the load to the display 60 in order to provide this information to the operator. The processor will also then repeat the process with another ten pressure measurements from the tilt and lift cylinders 36, 30 and repeat steps 78–88.

If the load moment is greater than 90% of the rated load moment of the lifting machine 10, the program will then determine 90 if the load moment is greater a second pre-determined load moment someone in the range of 100% to 120% (e.g., 110%) of the rated load moment. If the load moment is not greater 92 than 90% of the rated load moment of the lifting machine 10, the processor will then display a second warning, by illuminating the yellow light 66 located on the display 60. The processor will also output the calculated load weight, actual load moment, and center of gravity of the load to the display 60 in order to provide this information to the operator. The processor will also activate the low frequency alarm 68. The processor will then repeat the process with another ten pressure measurements from the tilt and lift cylinders 36, 30 and repeat steps 78–92.

If the load moment is greater than 110% of the rated load moment of the lifting machine 10, the program will then display 94 a third warning, by illuminating the red light 70 located on the display 60. The processor will also output the calculated load weight, actual load moment, and center of gravity of the load to the display 60 in order to provide this information to the operator. The processor will also activate the high frequency alarm 72 and disable lift function. The processor will also activate the load pressure switch 58 to disable the lift function. The processor will then repeat the process with another plurality of pressure measurements (e.g., ten pressure measurements) from the tilt and lift cylinders 36, 30 and repeat steps 78–94. Lift function will remain disabled if actual load moment remains greater than 110% of the rated load moment. Alternatively, lift function will be disabled if the pressure sensor 46 within the lift cylinder 30 measures pressure that correlates to the weight associated with the maximum lifting capacity of the lifting machine 10.

Figure 5:
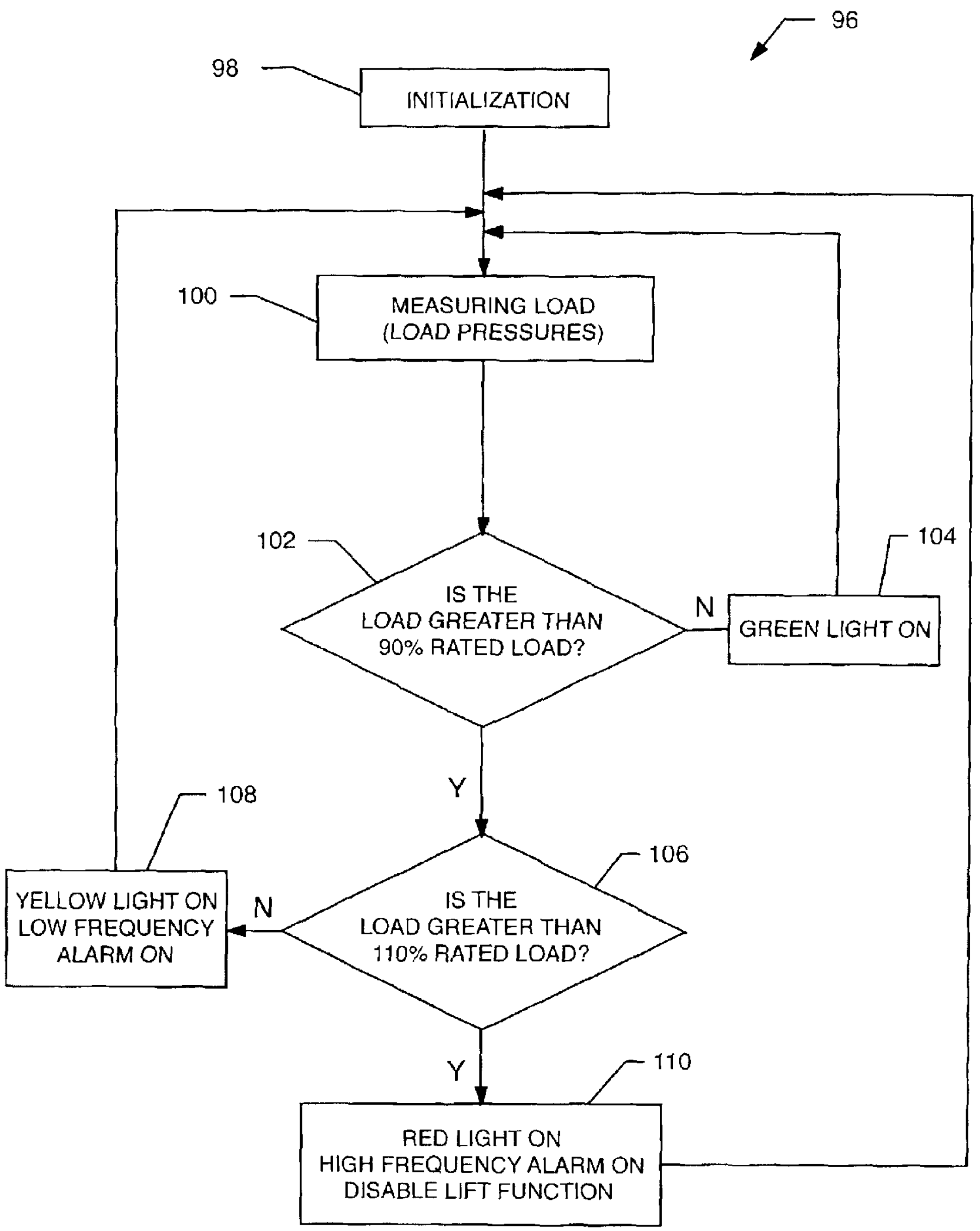
FIG. 5. is a flowchart illustrating an alternative process for determining the load moment of a load lifted by the marina bull of FIG. 1.

An alternative embodiment of a process 96 for monitoring load conditions on a lifting machine having a rated load moment is illustrated in FIG. 5. The process 96 is similar to the process 74 of FIG. 4 except that pressure switches are used instead of pressure transducers and no program is used to calculate values into load moments, weight, and load center of gravity. Instead, the pressure switches directly activate warnings if pressure measurements exceed operating parameters. The process begins with an initialization period 98, during which the lifting machine 10 is activated and a green light 66 located on the display 60 is illuminated if the pressure switches are not open. For example, at least two pressure switches are pre-set to open at certain pressures which have been respectively correlated to, for example, 90% and 110% of the rated load moment of the lifting machine 10 and are in fluid communication with the tilt cylinder 36 to measure pressure 100 within the cylinder 36. A pressure valve in fluid communication with the lift cylinder 30 is pre-set to open at a certain pressure which has been correlated to the maximum weight the lifting machine is able to lift.

The pre-set pressure switches 'measure' pressure 100 within their respective cylinders 30, 36, and set to determine if pressure within the tilt cylinder is greater than the pressure correlated to 90% of the rated load moment 102. If the pressure within the tilt cylinder 36 is not greater 104 than 90% of the rated load moment of the lifting machine 10, a first warning, in the form of the illuminated green light 64, will continue to be illuminated. The process continuously repeats as the pressure switch continues to 'measure' pressure within the tilt cylinder 36, and repeats steps 100–104.

If pressure within the tilt cylinder 36 is greater than the pressure correlated to 90% of the rated load moment 102, then the pressure switch pre-set to 90% of the rated load moment will open while the pressure switch pre-set to 110% of the rated load moment remains closed 106. If the actual load moment is not greater 108 than 110% of the rated load moment of the lifting machine 10, a second warning will be displayed by illuminating the yellow light 66 located on the display 60, and illuminating the low frequency alarm 68. The display 60 may also illuminate a warning indicator showing the approximate load moment which the pre-set pressure switch indicates has been exceeded. The process continuously repeats as the pressure switches continue to 'measure' pressure within the tilt cylinder 36, and repeats steps 100–108.

If the load moment is greater than 110% of the rated load moment of the lifting machine 10, a third warning will then be displayed 110, by illuminating the red light 70 located on the display 60, activating the high frequency alarm 72, and disabling the lift function. The process continuously repeats as the pressure switches continue to 'measure' pressure within the tilt cylinder 36, and repeats steps 100–110. Lift function will remain disabled if actual load moment remains greater than 110% of the rated load moment. If the actual weight of the load exceeds the lifting capacity of the lifting machine 10, the pre-set pressure switch in the lift cylinder 30, set to open when hydraulic fluid pressure within the lift cylinder 30 meets or exceeds the pressure correlated to the maximum lifting capacity of the lifting machine, will open and the lift function will be disabled.

In an alternative embodiment, a single pre-set pressure switch may be used to determine if pressure within the tilt cylinder 36 is greater than a pre-determined load moment. This pre-determined load moment can be set anywhere in the range of 100% to 150% of the rated load moment. If the single pre-set pressure switch is activated, electrical signals will be sent to illuminate the red light 70, sound an audio alarm, and/or activate the load pressure switch 58 to disable the lifting function of the lifting machine.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A process for monitoring load conditions on a lifting machine having a rated load moment, comprising the steps of:

determining an actual load moment of the lifting machine due a weighted load, the determining step including the steps of:

measuring a tilt pressure within a hydraulic tilt cylinder of the lifting machine, and calculating the actual load moment from the tilt pressure within the hydraulic tilt cylinder, and measuring a lift pressure within a hydraulic lift cylinder of the lifting machine, calculating the weight of the weighted load from the lift pressure, and calculating a location of the center of gravity of the weighted load using the actual load moment and the calculated weight;

activating a first warning if the actual load moment is below a first predetermined load moment;

activating a second warning if the actual load moment is above the firs t predetermined load moment and below a second predetermined load moment; and activating a third warning if the actual load moment is above the second predetermined load moment.

2. The system of claim 1, wherein the first, second, and third warnings are colored lights.

3. The process of claim 1, wherein the first predetermined load moment is 80% to 100% of the rated load moment.

4. The process of claim 1, wherein the second predetermined load moment is 100% to 120% of the rated load moment.

5. The process of claim 1, including the step of engaging an audio alarm if the actual load moment is above the first predetermined load moment and below the second predetermined load moment.

6. The process of claim 1, including the step of engaging an audio alarm if the actual load moment is above the second predetermined load moment.

7. The process of claim 1, including the step of disabling the lifting machine if a load pressure switch of the lifting machine is activated.

8. The process of claim 1, wherein the determining step includes the steps of weighing the weighted load and calculating a location of a center of gravity of the weighted load.

9. The process of claim 8, further including the step of providing information to a user about the weight and the location of the center of gravity of the weighted load, whereby a warning is provided to the user if the load is near the rated load moment of the lifting machine.

10. A process for monitoring load conditions on a lifting machine having a rated load moment, comprising the steps of:

measuring a tilt pressure within a hydraulic tilt cylinder of the lifting machine, and calculating an actual load moment of the lifting machine from the tilt pressure due to a weighted load on the lifting machine;

measuring a lift pressure within a hydraulic lift cylinder of the lifting machine, calculating the weight of the weighted load from the lift pressure and calculating a location of a center of gravity of the weighted load using the actual load moment and the calculated weight;

activating a first warning if the actual load moment is below a first predetermined load moment;

activating a second warning if the actual load moment is above the first predetermined load moment and below a second predetermined load moment;

and activating a third warning if the actual load moment is above the second predetermined load moment.

11. The system of claim 10 engaging a first audio alarm if the actual load moment is above the first predetermined load moment and below the second predetermined load moment, and engaging a second audio alarm if the actual load moment is above the second predetermined load moment.

12. The system of claim 11, wherein the first, second, and third warnings are colored lights.

13. The process of claim 10, wherein the first predetermined load moment is 80% to 100% of the rated load moment.

14. The process of claim 10, wherein the second predetermined load moment is 100% to 120% of the rated load moment.

15. The process of claim 10, including the step of disabling the lifting-machine if a load pressure switch of the lifting machine is activated.

16. The process of claim 10, further including the step of providing information to a user about the weight and the location of the center of gravity of the weighted load, whereby a warning is provided to the user if the load is at least 90% of the rated load moment of the lifting machine.

17. A hydraulic stabilizer system, comprising:

a hydraulic lift having a rated load moment;

a means for measuring pressure within the hydraulic lift;

a processor for determining an actual load moment of the hydraulic lift and for determining a weight of a load on the hydraulic lift based on pressure within the hydraulic lift;

an illuminated display for warning an operator of the hydraulic lift if at least one predetermined operating parameter is exceeded; and a load pressure switch for disabling the hydraulic lift if another predetermined operating parameter is exceeded;

wherein the hydraulic lift includes a frame, at least one load bearing member operationally connected to the frame for movement relative thereto, a hollow lift cylinder housing a lift piston and hydraulic fluid, the lift cylinder piston operationally connected to the load bearing member, with the hydraulic fluid disposed between the lift piston and one end of the frame, the lift piston imparting a lift force upon the hydraulic fluid within the lift cylinder proportional to a weight associated with the load bearing member, and a hollow tilt cylinder housing a tilt piston and hydraulic fluid, the tilt piston operationally connected to the load bearing member, with the hydraulic fluid within the tilt cylinder disposed between the tilt piston and one end of the frame, the tilt piston imparting a tilt force upon the fluid proportional to an actual load moment associated with the load bearing member; and wherein the means for measuring pressure within the hydraulic lift is a lift pressure sensor in fluid communication with the hydraulic fluid within the lift cylinder, for measuring pressure of the hydraulic fluid within the lift cylinder for a period of time and creating electrical signals corresponding thereto, defining at least one pressure measurement within the lift cylinder, with the pressure within the lift cylinder being related to the lift force associated with the load bearing member, and a tilt pressure sensor in fluid communication with the hydraulic fluid within the tilt cylinder, for measuring pressure of the hydraulic fluid within the tilt cylinder for a period of time and creating electrical signals corresponding thereto, defining at least one pressure measurement within the tilt cylinder, with the pressure being related to the tilt force associated with the load bearing member.

18. The system of claim 17, wherein the illuminated display is in data communication with the processor and produces a visual representation of the weight on the hydraulic lift.

19. The system of claim 17, wherein the processor includes a first sub-routine of a program stored in a memory to be operated on by the processor, determining, from at least one pressure measurement within the lift cylinder, the weight of the load on the hydraulic lift.

20. The system of claim 19, wherein the processor includes a second sub-routine of the program stored in the memory to be operated on by the processor, determining, from at least one pressure measurement within the tilt cylinder, the actual load moment of the load on the hydraulic lift.

21. The system of claim 17, the processor includes at least one sub-routine of a program stored in a memory to be operated on by the processor, determining, from at least one pressure measurement within the lift cylinder, the weight of the load on the hydraulic lift, and determining, from at least one pressure measurement within the tilt cylinder, the actual load moment of the load on the hydraulic lift, wherein another sub-routine of the program stored in the memory to be operated on by the processor uses the actual load moment and the weight of the load to determine a location of a center of gravity of the load on the hydraulic lift.

22. The system of claim 17, wherein the illuminated display activates a first warning if the actual load moment is below a first predetermined load moment, activates a second warning if the actual load moment is above the first predetermined load moment and below a second predetermined load moment, and activates a third warning if the actual load moment is above the second predetermined load moment.

23. The process of claim 22, wherein the first predetermined load moment is 80% to 100% of the rated load moment, and the second predetermined load moment is 100% to 120% of the rated load moment.

24. The system of claim 22, wherein the first, second, and third warnings are colored lights.

25. The system of claim 17, wherein the illuminated display engages a first audio alarm if the actual load moment is above a first predetermined load moment and below a second predetermined load moment, and engages a second audio alarm if the actual load moment is above the second predetermined load moment.

26. The process of claim 25, wherein the first predetermined load moment is 80% to 100% of the rated load moment, and the second predetermined load moment is 100% to 120% of the rated load moment.

27. The process of claim 17, wherein the hydraulic lift is disabled if the load pressure switch is activated.

28. A hydraulic stabilizer system, comprising:

a hydraulic lift having a rated load moment and maximum lifting capacity, wherein the hydraulic lift includes a frame, at least one load bearing member operationally connected to the frame for movement relative thereto, a hollow lift cylinder housing a lift piston and hydraulic fluid, the lift cylinder piston operationally connected to the load bearing member, with the hydraulic fluid disposed between the lift piston and one end of the frame, the lift piston imparting a lift force upon the hydraulic fluid within the lift cylinder proportional to a weight associated with the load bearing member, and a hollow tilt cylinder housing a tilt piston and hydraulic fluid, the tilt piston operationally connected to the load bearing member, with the hydraulic fluid within the tilt cylinder disposed between the tilt piston and one end of the frame, the tilt piston imparting a tilt force upon the fluid proportional to an actual load moment associated with the load bearing member;

at least one lift pressure switch in fluid communication with the hydraulic fluid within the lift cylinder, for measuring pressure of the hydraulic fluid within the lift cylinder, with the pressure within the lift cylinder being related to the lift force associated with the load bearing member, and at least one tilt pressure switch in fluid communication with the hydraulic fluid within the tilt cylinder, for measuring pressure of the hydraulic fluid within the tilt cylinder, with the pressure being related to the tilt force associated with the load bearing member;

an illuminated display for warning an operator of the hydraulic lift if at least one predetermined operating parameter is exceeded, wherein the illuminated display is in communication with the at least one lift pressure switch and the at least one tilt pressure switch; and a load pressure switch for disabling the hydraulic lift if another predetermined operating parameter is exceeded, wherein the lift pressure switch measures the lift force and the tilt pressure switch measures the tilt force, whereby the illuminated display activates a first warning if the actual load moment is below a first predetermined load moment, activates a second warning if the actual load moment is above the first predetermined load moment and below a second predetermined load moment, activates a third warning if the actual load moment is above the second predetermined load moment, and disables the hydraulic lift if the weight is above the maximum lifting capacity.

29. The process of claim 28, wherein the first predetermined load moment is 80% to 100% of the rated load moment, and the second predetermined load moment is 100% to 120% of the rated load moment.

30. The system of claim 28, wherein the first, second, and third warnings are colored lights.

31. The system of claim 28, wherein the illuminated display engages a first audio alarm if the actual load moment is above a first predetermined load moment and below a second predetermined load moment, and engages a second audio alarm if the actual load moment is above the second predetermined load moment.

32. The process of claim 28, wherein the hydraulic lift is disabled if the load pressure switch is activated.

33. A hydraulic stabilizer system, comprising:

a hydraulic lift having a rated load moment and maximum lifting capacity, wherein the hydraulic lift includes a frame, at least one load bearing member operationally connected to the frame for movement relative thereto, a hollow lift cylinder housing a lift piston and hydraulic fluid, the lift cylinder piston operationally connected to the load bearing member, with the hydraulic fluid disposed between the lift piston and one end of the frame, the lift piston imparting a lift force upon the hydraulic fluid within the lift cylinder proportional to a weight associated with the load bearing member, and a hollow tilt cylinder housing a tilt piston and hydraulic fluid, the tilt piston operationally connected to the load bearing member, with the hydraulic fluid within the tilt cylinder disposed between the tilt piston and one end of the frame, the tilt piston imparting a tilt force upon the fluid proportional to an actual load moment associated with the load bearing member;

at least one tilt pressure switch in fluid communication with the hydraulic fluid within the tilt cylinder, for measuring pressure of the hydraulic fluid within the tilt cylinder, with the pressure being related to the tilt force associated with the load bearing member;

an illuminated display for warning an operator of the hydraulic lift if at least one predetermined operating parameter is exceeded, wherein the illuminated display is in communication with the at least one tilt pressure switch; and a load pressure switch for disabling the hydraulic lift if the predetermined operating parameter is exceeded, wherein the tilt pressure switch measures the tilt force, whereby the illuminated display activates a warning if the actual load moment is above a predetermined load moment.

34. The process of claim 33, wherein the predetermined load moment ranges from 100% to 150% of the rated load moment.

35. The system of claim 33, wherein the warning is a colored light.

36. The system of claim 33, wherein the illuminated display engages an audio alarm if the actual load moment is above the predetermined load moment.

37. The process of claim 33, wherein the hydraulic lift is disabled if the load pressure switch is activated.

38. A hydraulic stabilizer system, comprising:

a hydraulic lift having a rated load moment;

a means for measuring pressure within the hydraulic lift;

a processor for determining an actual load moment of the hydraulic lift and for determining a weight of a load on the hydraulic lift based on pressure within the hydraulic lift, the processor including at least one subroutine of a program stored in a memory to be operated on by the processor, determining, from at least one pressure measurement within the lift cylinder, the weight of the load on the hydraulic lift, and determining, from at least one pressure measurement within the tilt cylinder, the actual load moment of the load on the hydraulic lift, wherein another sub-routine of the program stored in the memory to be operated on by the processor uses the actual load moment and the weight of the load to determine a location of a center of gravity of the load o the hydraulic lift;

an illuminated display for warning an operator of the hydraulic lift if at least one predetermined operating parameter is exceeded; and a load pressure switch for disabling the hydraulic lift if another predetermined operating parameter is exceeded.

39. The system of claim 38, wherein the hydraulic lift includes a frame, at least one load bearing member operationally connected to the frame for movement relative thereto, a hollow lift cylinder housing a lift piston and hydraulic fluid, the lift cylinder piston operationally connected to the load bearing member, with the hydraulic fluid disposed between the lift piston and one end of the frame, the lift piston imparting a lift force upon the hydraulic fluid within the lift cylinder proportional to a weight associated with the load bearing member, and a hollow tilt cylinder housing a tilt piston and hydraulic fluid, the tilt piston operationally connected to the load bearing member, with the hydraulic fluid within the tilt cylinder disposed between the tilt piston and one end of the frame, the tilt piston imparting a tilt force upon the fluid proportional to an actual load moment associated with the load bearing member.

40. The system of claim 39, wherein the means for measuring pressure within the hydraulic lift is a lift pressure sensor in fluid communication with the hydraulic fluid within the lift cylinder, for measuring pressure of the hydraulic fluid within the lift cylinder for a period of time and creating electrical signals corresponding thereto, defining at least one pressure measurement within the lift cylinder, with the pressure within the lift cylinder being related to the lift force associated with the load bearing member, and a tilt pressure sensor in fluid communication with the hydraulic fluid within the tilt cylinder, for measuring pressure of the hydraulic fluid within the tilt cylinder for a period of time and creating electrical signals corresponding thereto, defining at least one pressure measurement within the tilt cylinder, with the pressure being related to the tilt force associated with the load bearing member.

41. The system of claim 38 wherein the illuminated display is in data communication with the processor and produces a visual representation of the weight on the hydraulic lift.

42. The system of claim 38, wherein the processor includes a first sub-routine of a program stored in a memory to be operated on by the processor, determining, from at least one pressure measurement within the lift cylinder, the weight of the load on the hydraulic lift.

43. The system of claim 42, wherein the processor includes a second subroutine of the program stored in the memory to be operated on by the processor, determining, from at least one pressure measurement within the tilt cylinder, the actual load moment of the load on the hydraulic lift.

44. The system of claim 38, wherein the illuminated display activates a first warning if the actual load moment is below a first predetermined load moment, activates a second warning if the actual load moment is above the first predetermined load moment and below a second predetermined load moment, and activates a third warning if the actual load moment is above the second predetermined load moment.

45. The process of claim 44, wherein the first predetermined load moment is 80% to 100% of the rated load moment, and the second predetermined load moment is 100% to 120% of the rated load moment.

46. The system of claim 44, wherein the first, second, and third warnings are colored lights.

47. The system of claim 38, wherein the illuminated display engages a first audio alarm if the actual load moment is above a first predetermined load moment and below a second predetermined load moment, and engages a second audio alarm if the actual load moment is above the second predetermined load moment.

48. The process of claim 47, wherein the first predetermined load moment is 80% to 100% of the rated load moment, and the second predetermined load moment is 100% to 120% of the rated load moment.

49. The process of claim 38, wherein the hydraulic lift is disabled if the load pressure switch is activated.

* * * * *